(12) United States Patent
Tsuyemura et al.

(10) Patent No.: US 12,043,266 B1
(45) Date of Patent: Jul. 23, 2024

(54) AUTOMATED SETTING ADJUSTMENTS BASED ON VEHICLE-OCCUPANCY STATES

(71) Applicant: Amazon Technologies, Inc., Seattle, WA (US)

(72) Inventors: Kellie Akemi Tsuyemura, Redwood City, CA (US); Matt L Chaboud, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 17/854,761

(22) Filed: Jun. 30, 2022

(51) Int. Cl.
*B60W 40/08* (2012.01)
*B60N 2/00* (2006.01)
*B60R 11/02* (2006.01)

(52) U.S. Cl.
CPC ............ *B60W 40/08* (2013.01); *B60N 2/002* (2013.01); *B60R 11/0217* (2013.01); *B60W 2040/0881* (2013.01)

(58) Field of Classification Search
CPC .................. B60N 2/002; B60W 2040/0881
See application file for complete search history.

(56) References Cited

U.S. PATENT DOCUMENTS

| | | | |
|---|---|---|---|
| 6,778,672 B2* | 8/2004 | Breed | G01S 7/417 381/86 |
| 10,061,557 B1* | 8/2018 | Prakah-Asante | G06F 3/165 |
| 2018/0065642 A1* | 3/2018 | Frye | B60R 16/037 |
| 2018/0134116 A1* | 5/2018 | Chen | B60N 2/976 |
| 2018/0178808 A1* | 6/2018 | Zhao | B60N 2/20 |
| 2021/0016686 A1* | 1/2021 | Yetukuri | B60N 2/5678 |

\* cited by examiner

*Primary Examiner* — Sizo B Vilakazi
(74) *Attorney, Agent, or Firm* — Lee & Hayes, P.C.

(57) ABSTRACT

This disclosure is directed to, in part, techniques for determining occupancy states of a vehicle over time and adjusting settings associated with the vehicle based at least in part on these occupancy states. For instance, an example vehicle may include an array of sensors that may generate sensor data for identifying an occupancy state of a vehicle. These sensors may include cameras, microphones, in-seat weight sensors, seatbelt sensors, door-latch sensors, and the like, which may be used to generate sensor data indicative of a current occupancy state of a vehicle. An occupancy state may include a number of occupants of the vehicle, the location of these occupants within the vehicle, the identity of these occupants, and/or the like.

20 Claims, 8 Drawing Sheets

AUTOMATED SETTING ADJUSTMENTS BASED ON VEHICLE-OCCUPANCY STATES

BACKGROUND

People use vehicles to perform many daily tasks, such as commuting to work, running errands, driving family members to events, and the like. Given the array of uses of a vehicle in today's world, the occupancy state of a particular vehicle often changes over time. For instance, an owner of a vehicle may use the vehicle to commute by herself to work, while later in the day using the vehicle to pick up her son or daughter and their friends from school, and still later in the day driving the vehicle to dinner with a friend. In addition to their continued ubiquity in daily life, the technology onboard these vehicles continues to advance.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
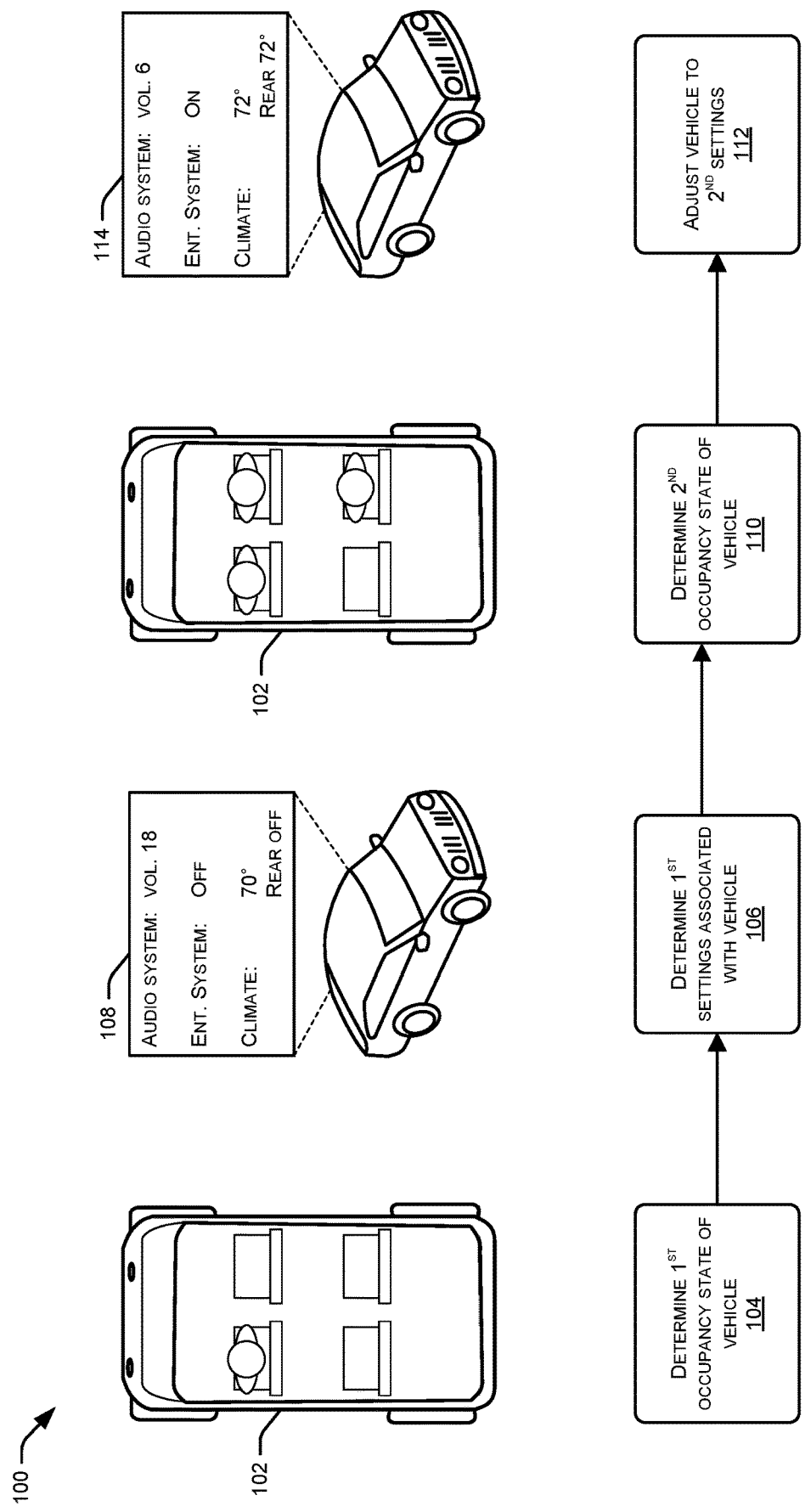
FIG. 1 illustrates an example process in which components onboard or otherwise associated with a vehicle are able to use sensor data generated by sensors of the vehicle to determine a first occupancy state of the vehicle, store an association between the first occupancy state and one or more settings of the vehicle, use additional sensor data generated by the sensors to determine a second occupancy state of the vehicle at a later time and, if the second occupancy differs from the first occupancy state by a threshold amount, adjust the settings of the vehicle. In this example, for instance, the components may adjust a volume of the audio system, may turn on an entertainment system, and/or may alter a setting of a climate-control system of the vehicle.

This disclosure is directed to, in part, techniques for determining occupancy states of a vehicle over time and adjusting settings associated with the vehicle based at least in part on these occupancy states. For instance, an example vehicle may include an array of sensors that may generate sensor data for identifying an occupancy state of a vehicle. These sensors may include cameras, microphones, in-seat weight sensors, seatbelt sensors, door-latch sensors, and the like, which may be used to generate sensor data indicative of a current occupancy state of a vehicle. An occupancy state may include a number of occupants of the vehicle, the location of these occupants within the vehicle, the identity of these occupants, and/or the like. It is to be appreciated that the techniques described herein may only determine the identity of vehicle occupants upon receiving express consent and approval of the occupants.

Upon analyzing the sensor data to determine a current occupancy state, the techniques described herein may also determine settings associated with the vehicle during the occupancy state. For instance, the techniques may determine a volume level of an audio system of the vehicle, content being played by the audio system, a state of the entertainment system (e.g., whether a rear display in the vehicle is on or off, the content being played, etc.), a state of the climate-control system of the vehicle, and the like. In some instances, the techniques may store an association between the determined occupancy state and these settings such that the settings may be replicated or approximated upon detection of a future occurrence of the occupancy state. For instance, of the occupancy state represents a driver with no passengers, then upon later detecting the same occupancy state of the vehicle, the techniques may implement the same or similar settings upon detecting this occurrence. In some instances, the techniques may take into account the identity of the person and in response to identifying this same person (with no other passenger), the techniques may implement the stored settings.

In other instances, the techniques may determine when the occupancy state changes and, in response, may alter one or more of the settings. For instance, continuing the example from above, the techniques may determine certain settings of the audio, entertainment, and climate-control systems during use of the vehicle while the vehicle is in a first occupancy state, such as a single driver with no passengers. If sometime thereafter, the techniques detect a different occupancy state, such as multiple passengers of the vehicle rather than a single passenger, then the techniques may adjust one or more of the settings. For instance, upon detecting the new occupancy state of the vehicle (e.g., corresponding to multiple passengers), the techniques may turn off (or on) the audio or entertainment system, turn down (or up) a volume of the audio or entertainment system, turn on (or off) or otherwise change settings of the climate-control system, or the like. In one example, the techniques may turn down a volume of the audio system upon detecting the change of a single-occupant occupancy state to a multi-occupant occupancy state to avoid a scenario where the multiple users are subject to a loud volume previously enjoyed by the single occupant of the vehicle.

In some instances, the techniques may utilize a probabilistic model for detecting changes to an occupancy state of a vehicle and for determining whether to adjust one or more settings associated with the vehicle. For instance, the probabilistic model may receive, as inputs, sensor data generated by one or more sensors within the vehicle, information regarding current settings of the systems of the vehicle (e.g., audio volume, content being played, whether an entertainment system is currently on, whether a climate-control system is on, a temperature of the climate-control system, etc.), and additional information (e.g., a time of day, a day of the week, etc.) for determining whether an occupancy change has occurred and whether to adjust one or more settings of the vehicle in response. As introduced above, the sensor data input into the probabilistic model may comprise image data generated by one or more cameras of the vehicle, audio data generated by one or more microphones of the vehicle, weight data from weight sensors within the seats of the vehicle, data indicating which seatbelts of the vehicle are currently latched, data indicating which doors have recently open and shut, information regarding which key has been placed into the ignition or otherwise detected by the vehicle (e.g., a phone-based key), information regarding a current setting of an automated seat or mirror, and/or the like. The probabilistic model may trained using labeled training data to associate this sensor data with different occupancy states.

In addition, the probabilistic model may determine when an occupancy-state has occurred and whether to adjust one or more settings in response. For example, in some instances the probabilistic model may be programmed or tuned by a user to automatically adjust to certain settings in response to some or all occupancy-state changes. For instance, a user may configure the model to turn off the audio and entertainment systems in response to detecting a change in occupancy state from a previous use of the vehicle. In some instances, the user may configure the model to make setting changes based on certain occupancy-state changes (e.g., from a particular occupancy state to another), while making different changes (or no change) based on different occupancy-state changes (e.g., from a different beginning and/or end occupancy state). In other instances, the probabilistic model may cause the settings of certain systems of the vehicle (e.g., audio, entertainment, and climate-control system) to gracefully adjust based on the degree of a change in an occupancy state of the vehicle, an amount of time between the different occupancy states, and so forth. It is to be appreciated that each of these factors may be tunable by a user.

To provide an example, a user may configure the model to suppress a volume level of the audio system of the vehicle to a predefined setting in response to the model determining that the occupancy state of the vehicle has changed from a single occupant to a multi-occupant occupancy state. In another example, the model may be configured to pause playback of the audio and/or entertainment system in response to identifying a change in the occupancy state of the vehicle. In yet another example, a user may configure the model to turn off (or on) an entertainment system in response to a change from an occupancy state in which passenger(s) previously occupied the backseat(s) to an occupancy state in which passenger(s) no longer occupy these seats. In the alternative, the user may configure the model to turn on (or off) an entertainment system in response to a change from an occupancy state in which passenger(s) do not occupy the backseat(s) to an occupancy state in which passenger(s) do occupy these seats.

Of course, while a few nonlimiting examples are provided, it is to be appreciated that the techniques may adjust the settings in any manner based on any other occupancy-state change. Further, while the above examples describe adjusting the settings of the audio, entertainment, and/or climate-control systems of the vehicle, it is to be appreciated that the techniques may adjust any other components of the vehicle in response to detecting an occupancy state change, such transport controls, volume and tuning states (e.g., front/rear/left/right fade and balance, equalizer settings, etc.), an illumination state of interior or exterior lights, and/or the like.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example process 100 in which components onboard or otherwise associated with a vehicle 102 are able to use sensor data generated by sensors of the vehicle 102 to determine an occupancy state and, in some instances, automatically adjust one or more settings of the vehicle. As described in further detail below with reference to FIG. 2 and corresponding text, in some instances some or all of the operations may be performed by one or more components of the vehicle 102, while in other instances some or all of the operations may be performed by computing devices that are located remote from, but are wirelessly coupled to, the vehicle 102.

An operation 104 represents determining a first occupancy state of the vehicle. For instance, this operation may represent determine a number of occupants of the vehicle, the location of these occupants, the identity of these occupants, or the like. For instance, the operation 104 may represent generating sensor data using one or more sensors of the vehicle 102 and analyzing the sensor data to determine the first occupancy state. For instance, the vehicle may include door-latch sensors for generating data indicative of which doors have recently been opened and closed, one or more seatbelt sensors for determining which seatbelts in the vehicle 102 are currently latched, one or more weight sensors in the seats to generate weight data indicative of which seats currently hold an occupant, one or more cameras for generating image data indicative of where people are located within the vehicle 102 and potentially the identity of these people, one or more microphones for generating audio data indicative of a number of occupants in the vehicle 102 and potentially the identity of these people, and the like. In addition, the operation 104 may include receiving data such as which key or key fob is currently located in the vehicle 102, the current seat and mirror adjustments of the seats and mirrors of the vehicle 102, and so forth.

This data may be collectively analyzed to determine the first occupancy state of the vehicle 102. For instance, this data may be input to a probabilistic model that has been trained to output an indication of a current occupancy state of the vehicle 102. In some instance, this first occupancy state represents the number of occupants. In other instances, the first occupancy state represents the number of occupants and their location within the vehicle 102. In still other instances, the first occupancy state represents the number of occupants, as well as their locations within the vehicle 102 and their identity. In this example, the first occupancy state indicates that the vehicle 102 includes a single occupant driver.

An operation 106 represents determining first settings 108 associated with the vehicle proximate in time to the determining of the first occupant state. For instance, after, before, and/or during determining the first occupancy state, the vehicle 102 may determine the current, first settings 108 of one or more subsystems of the vehicle 102. In this example, the first settings indicate that the volume of the audio system is currently set to "18", the entertainment system is currently off, and the climate-control system is set to seventy degrees, although off in the back portion of the vehicle 102. In some instances, the vehicle may store these first settings 118 in association with the first occupancy state. Of course, while a few example settings are illustrated here, it is to be appreciated that the settings may comprise any other type of vehicle-system setting.

At an operation 110, the vehicle 102 may determine whether there is a change to the occupancy state of the vehicle 102. In this example, for instance, this operation comprises determining a second occupancy state that is different from the first occupancy state. Similar to the above, this operation may represent determine a number of occupants of the vehicle, the location of these occupants, the identity of these occupants, or the like. For instance, the operation 110 may represent generating sensor data using one or more sensors of the vehicle 102 and analyzing the sensor data to determine the second occupancy state. Again, the sensor data may be generated using door-latch sensors for generating data indicative of which doors have recently been opened and closed, seatbelt sensors for determining which seatbelts in the vehicle 102 are currently latched, weight sensors in the seats to generate weight data indicative of which seats currently hold an occupant, to generate image data indicative of where people are located within the vehicle 102 and potentially the identity of these people, microphones to generate audio data indicative of a number of occupants in the vehicle 102 and potentially the identity of these people, and the like. In addition, the operation 110 may include receiving data such as which key or key fob is currently located in the vehicle 102, the current seat and mirror adjustments of the seats and mirrors of the vehicle 102, and so forth.

This data may be collectively analyzed to determine the second occupancy state of the vehicle 102. For instance, this data may be input to the probabilistic model that has been trained to output an indication of a current occupancy state of the vehicle 102. Again, this second occupancy state may represent the number of occupants, the number of occupants and their location within the vehicle 102, the number of occupants, as well as their locations within the vehicle 102 and their identity, or the like. In this example, the second occupancy state indicates that the vehicle 102 now includes three occupants (a driver and two passengers).

An operation 112 represents adjusting one or more vehicle subsystems to second settings 114. For instance, based on the change from the first occupancy state to the second occupancy state, the model may output instructions to change the system settings from the first settings 108 to the second settings 114. As illustrated, this may comprise turning the volume of the audio system down to "6", turning the entertainment system (e.g., rear display) on, and turning up the climate-control system (front and rear) to seventy-two degrees. Of course, while FIG. 1 illustrates example occupancy states and settings, it is to be appreciated that other occupancy-state changes may result in different setting adjustments.

Figure 2:
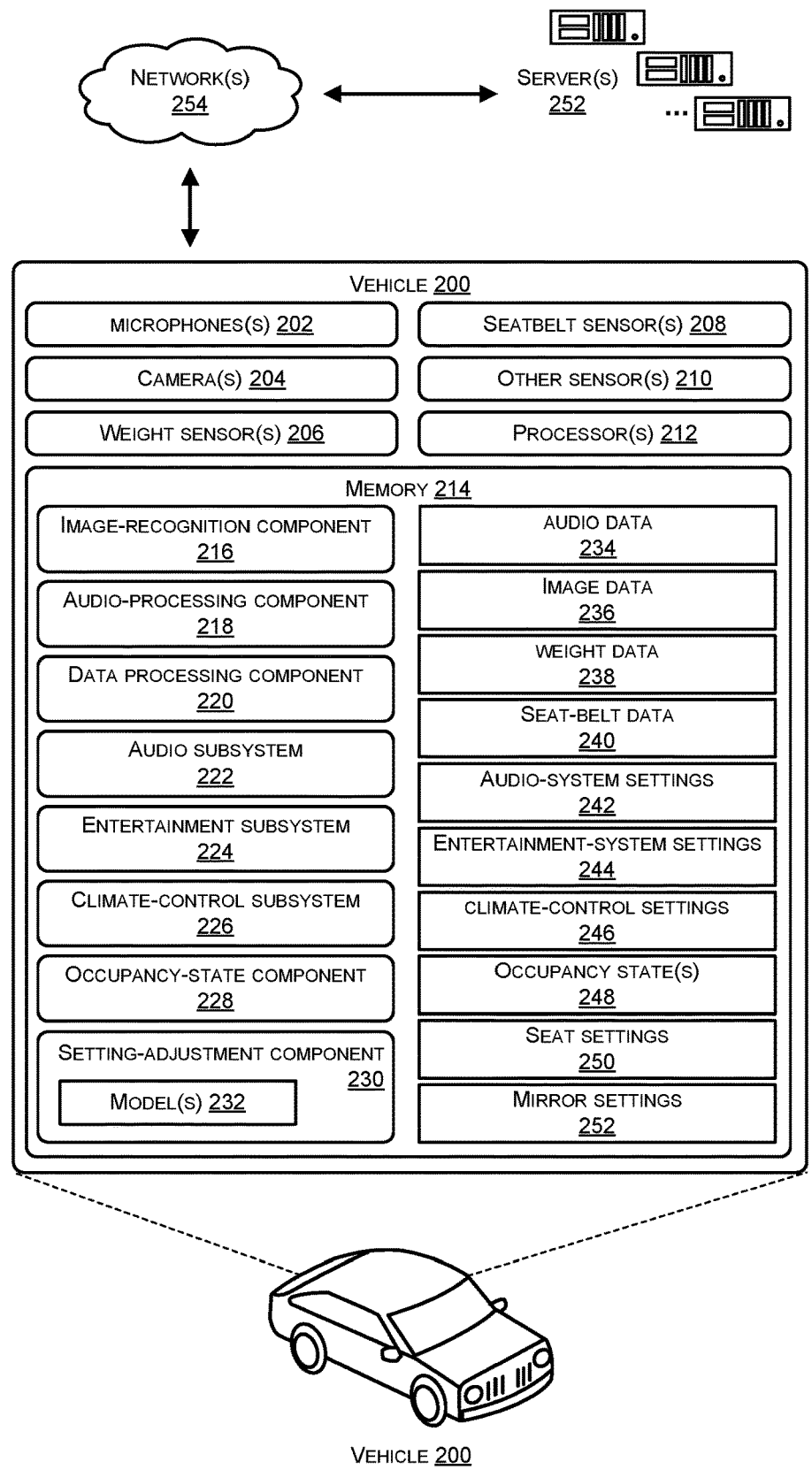
FIG. 2 illustrates example components of the vehicle for performing some or all of the operations of the process of FIG. 1. For instance, this figure illustrates that the vehicle may include multiple sensors to generate sensor data, as well as components to identify different occupancy states using the sensor data and, potentially, alter setting(s) of one or more systems of the vehicle based on a current occupancy state.

FIG. 2 illustrates example components of a vehicle 200 for performing some or all of the operations of the process of FIG. 1. For instance, this figure illustrates that the vehicle 200 may include multiple sensors to generate sensor data, as well as components to identify different occupancy states using the sensor data and, potentially, alter setting(s) of one or more systems of the vehicle based on a current occupancy state.

As illustrated, the vehicle 200 may include one or more microphones 202, one or more cameras 204, one or more weight sensors 206, one or more seatbelt sensors 208, and one or more additional sensors 210. The microphones 202 may reside inside and/or outside the cabin of the vehicle and may generate corresponding audio data 234, which may be used to identify a current occupancy state of the vehicle 200 and/or a change in occupancy state of the vehicle 200. For instance, the audio data 234 may be used by the components described below to identify a number of occupants of the vehicle 200, the identity of the occupants, the location of the occupants in the vehicle 200, and/or so forth. The cameras 204, meanwhile, may also reside inside and/or outside of the cabin of the vehicle 200 and may generate corresponding image data 236, which may be used to identify a current occupancy state of the vehicle 200 and/or a change in occupancy state of the vehicle 200. For instance, the image data 236 may be used by the components described below to identify a number of occupants of the vehicle 200, the identity of the occupants, the location of the occupants in the vehicle 200, and/or so forth.

The weight sensors 206 may, in some instances, reside within (e.g., underneath) respective seating areas of the vehicle 200 and may generate corresponding weight data 238, which may also be used to identify a current occupancy state of the vehicle 200 and/or a change in occupancy state of the vehicle 200. For instance, the weight data 238 may be used by the components described below to identify a number of occupants of the vehicle 200, the identity of the occupants, the location of the occupants in the vehicle 200, and/or so forth. For instance, the weight data 238 may be analyzed to determine a number of seats within the vehicle that are currently occupied, the location of the occupants in the vehicle, and so forth. The seatbelt sensors 208 may generate seatbelt data 240, which may be used similarly. That is, the components described below may analyze the seatbelt data to determine which seats are occupied by an occupant and their respective locations in the vehicle. In addition, while FIG. 2 describes several example sensors and corresponding sensor data that may be generated and analyzed, it is to be appreciated that other sensors may additionally or alternatively be used to identify a current occupancy state of the vehicle, a change in the occupancy state of the vehicle, and so forth.

Also as illustrated, the vehicle 200 may include one or more processors 212 and memory 214, which may store an image-recognition component 216, an audio-processing component 218, and a data-processing component 220. While each of these components may be separate from an occupancy-state component 228 described below, it is to be appreciated that some or all of these components may be integral with the occupancy-state component. Regardless of the configuration, the image-recognition component 216 may be configured to analyze the image data 236 to determine a number of occupants of the vehicle 200 at a given time, an identity of these occupants, a location of these occupants, in the vehicle 200, and/or the like. For instance, the image-recognition component 216 may utilize one or more computer-vision techniques for analyzing the image data 236 and determining a number, identity, and/or locations of the current occupants of the vehicle 200. In some instances, the image-recognition component comprises a trained machine-learning model for analyzing the image data 236 and outputting an indication of a number of current occupants of the vehicle 200, an identity of the occupants, a location of the occupants in the vehicle, and/or the like. The data-processing component 220, meanwhile, may represent one or more components configured to analyze the data generated by other sensors of the vehicle, such as the weight data 238, the seatbelt data 240, and so forth. Again, the data-processing component(s) 220 may be configured to analyze this data for determining information regarding a current occupancy state of the vehicle 200 and/or a change in the occupancy state.

In some instances, the occupancy-state component 228 may be configured to receive data from the one or more of the image-recognition component 216, the audio-processing component 218, and/or the data-processing component(s) 220 to determine a current occupancy state of the vehicle 200 and/or a change in the occupancy state. In other instances, the occupancy-state component 228 may receive, as input, the sensor data itself (e.g, the audio data 234, the image data 236, etc.) for determining the current occupancy and/or the change in the occupancy states of the vehicle 200. In either instance, the occupancy-state component 228 may determine a current occupancy state of the vehicle 200 in any number of manners. For instance, the occupancy-state component 228 may analyze a single piece of data for making this determination, or multiple pieces of data. For instance, the component 228 may analyze the image data 236 to directly determine the occupancy state of the vehicle. For instance, the occupancy-state component 228 may directly analyze the image data 236 to determine a number of faces or bodies represented in the image data 236 and may store a total number of occupants of the vehicle 200 as the occupancy state. In other instances, the component 228 may receive this information from the image-recognition component 216. In other instances, the occupancy-state component 228 may directly analyze the audio data 234 to determine a number of unique voices represented in the audio data 234 and may use this number of a unique voices as store a total number of occupants of the vehicle 200, which in turn may be stored as the occupancy state. In other instances, the component 228 may receive this information from the audio-processing component 218. In still other instances, the occupancy-state component 228 may directly analyze the weight data 238 to determine a number of seats having a current weight that is greater than a threshold amount of weight and may use this number as the total number of occupants of the vehicle 200, which in turn may be stored as the occupancy state. In other instances, the component 228 may receive this information from the data-processing component 220. In still other instances, the occupancy-state component 228 may directly analyze the seatbelt data 240 to determine a number of seatbelts that are current latched and may use this number as the total number of occupants of the vehicle 200, which in turn may be stored as the occupancy state. In other instances, the component 228 may receive this information from the data-processing component 220.

Further, while the above examples describe the occupancy-state component 228 determining the current occupancy state of the vehicle 200 based on analyzing a single type of data, in some instances this component 228 may analyze multiple types of data for making this determination. For instance, the occupancy-state component 228 may comprise a trained model configured to receive each of the data described above as inputs and may output an indication of a current occupancy state of the vehicle 200. Regardless of the technique used to determine the current occupancy state of the vehicle 200, this information may be stored as occupancy states 248. In some instances, the occupancy states 248 may indicate multiple different occupancy states that have occurred within the vehicle 200 and the times at which these occupancy states occurred.

In addition to the above, the vehicle 200 may include an audio subsystem 222, an entertainment subsystem 224, a climate-control subsystem 226, and/or an array of one or more other vehicle subsystems. Each of these subsystems may be controlled by one or more occupants of the vehicle 200. For instance, an occupant of the vehicle may cause the audio subsystem 222 to play certain music or other audio content at a certain volume level, may cause the entertainment subsystem 224 to play certain audiovisual content (e.g., on a display(s) in the vehicle, such as a rear-seat display) at a certain volume level, may cause the climate-control subsystem 226 to operate at certain parameters (e.g., heat/air-conditioning, certain vents on/off, specified temperature, heated seats on/off, etc.), and so forth. As will be appreciated, occupant(s) of the vehicle may cause control these subsystems to an array of different settings, including mirror settings, seat-placement settings, and the like. As the occupant(s) control these subsystems, the selected parameters may be stored. For instance, how occupant(s) control the audio subsystem 222 may be stored as audio-system settings 242, how occupant(s) control the entertainment subsystem 224 may be stored as audio-system settings 244, how occupant(s) control the climate-control subsystem 226 may be stored as climate-control settings 246, and so forth. In addition, certain additional or alternative settings may be stored by the vehicle, such as seat settings 250, mirror settings 252, and so forth.

In some instances, the occupancy-state component 228 or another component may store an association between each particular occupancy state and vehicle settings, such as some or all of the setting described immediately above. For instance, the occupancy-state component 228 may store an indication that a first occupancy state, corresponding to a single occupant, is associated with a certain volume level, with the entertainment system being powered off, and with a certain climate-control setting. The occupancy-state component 228 may also store an indication that a second occupancy state, corresponding to multiple occupants, is associated with a different volume level, with the entertainment system being powered on, and with a different climate-control setting. In some instances, the values of these settings may be stored over time such that an average setting may be determined (e.g., an average volume level for a single occupant of the vehicle) or for determining other factors that may affect the settings (e.g., time of day, current ambient weather, etc.).

As described above with reference to FIG. 1, the vehicle 200 may further implement techniques for determining whether and, if so, how to adjust one or more settings of the vehicle 200 based on a current occupancy state of the vehicle 200. In this regard, the vehicle 200 is further illustrated as including a settings-adjustment component 230 configured to adjust one or more settings of the vehicle based at least in part on a current occupancy state of the vehicle 200 and based at least in part on settings previously associated with that particular occupancy state. For instance, upon the occupancy-state component 228 providing an indication that the vehicle 200 is currently in the first example occupancy state from above (a single occupant), the settings-adjustment component 230 may determine which settings have previously been applied in the vehicle 200 during previous iterations of this particular occupancy state. For instance, the settings-adjustment component 230 may determine that the single driver of the vehicle 200 often listens to a certain type of music and a relatively loud volume level, and the settings-adjustment component 230 may cause the audio subsystem 222 to transition to the specified, high volume level. Conversely, upon the settings-adjustment component 230 detecting that the occupancy state has transitioned from the first occupancy state to a second occupancy state (e.g., multiple occupants), the settings-adjustment component 230 may determine previous settings often applied to the vehicle 200 in the current occupancy state and may cause the particular subsystems to implement these settings. For instance, the settings-adjustment component 230 may turn the volume level down and so forth.

In some instances, the settings-adjustment component 230 comprises one or more trained models 232 configured to receive inputs, such as a current occupancy state of a vehicle, an amount of change from a prior occupancy state, an amount of time that has elapsed since the prior occupancy state, and so forth, and may output an indication of one or more actions for the settings-adjustment component 230 to perform. For instance, the settings-adjustment component 230 may include a model 232 that has been trained based on an array of data, such as vehicle settings during prior occupancy states, times of day during these settings and occupancy states, weather during these settings and occupancy states, seasons during these settings and occupancy states, identities of the occupants during these settings and occupancy states, locations of the vehicle 200 during these settings and occupancy states, and/or the like. After being trained, the model 232 may receive one or more inputs, such as the current occupancy state, time of day, season, current weather, previous occupancy state, time since the last occupancy state, time since last use of the vehicle, identity of previous occupants and current occupants, and/or the like for determine whether to change one or more settings based on the change in occupancy states. Therefore, in some instances the settings-adjustment component 230 may utilize a continuous function that receives an array of input data and outputs an indication of whether to change one or more settings of the vehicle 200 and an extent to which to change the settings. In general, the settings-adjustment component 230 may, upon detecting a change in occupancy state to a particular occupancy state, transition from the current vehicle settings to vehicle settings previously employed during the particular occupancy state.

As illustrated, the vehicle 200 may include one or more hardware processors 212 (processors) configured to execute one or more stored instructions. The processors may comprise one or more cores. The vehicle 200 may include one or more input/output (I/O) interface(s) to allow the processor or other portions of the vehicle 200 to communicate with other devices. The I/O interfaces may comprise Inter-Integrated Circuit (I2C), Serial Peripheral Interface bus (SPI), Universal Serial Bus (USB) as promulgated by the USB Implementers Forum, and so forth. The I/O interfaces may allow the various modules/components to communicate with each other and/or control each other.

The vehicle 200 may also include one or more communication interfaces. The communication interfaces are configured to provide communications between the vehicle 200 and other devices, such as the server(s), sensors, interface devices, routers, and so forth. The communication interfaces may include devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. The vehicle 200 may also include one or more busses or other internal communications hardware or software that allow for the transfer of data between the various modules and components of the vehicle 200.

The vehicle 200 may include one or more memories 214. The memory comprises one or more computer-readable storage media (CRSM). The CRSM may be any one or more of an electronic storage medium, a magnetic storage medium, an optical storage medium, a quantum storage medium, a mechanical computer storage medium, and so forth. The memory provides storage of computer-readable instructions, data structures, program modules, and other data for the operation of the vehicle 200. A few example functional modules are shown stored in the memory, although the same functionality may alternatively be implemented in hardware, firmware, or as a system on a chip (SOC).

The memory 214 may include at least one operating system (OS) component. The OS component is configured to manage hardware resource devices such as the I/O interfaces, the communication interfaces, and provide various services to applications or components executing on the processors. The OS component may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

While a few example components of the vehicle 200 have been described, it is to be appreciated that the vehicle 200 may include one or more additional or different components. Further, the vehicle 200 may couple to one or more servers 252 over one or more networks 254. It is to be appreciated that some or all of the components described as residing on the vehicle may additionally or alternatively reside on the servers 252. Further, it is to be appreciated that the techniques and processes described herein may be performed by the vehicle, the servers 252, and/or a combination thereof.

Figure 3A:
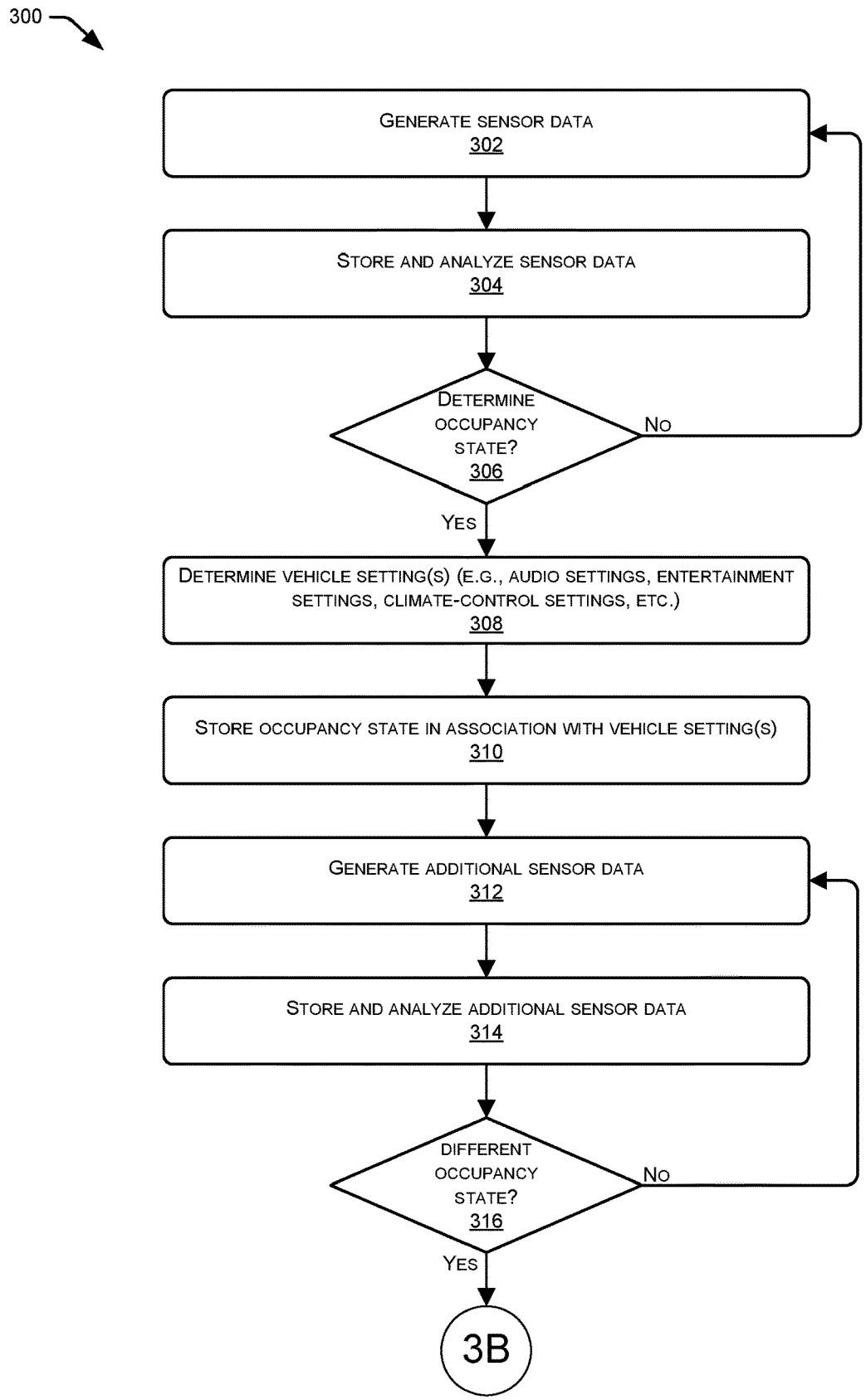
FIGS. 3A-B collectively illustrate a flow diagram of an example process for storing settings in association with different occupancy states, as well as adjusting these settings upon detecting a new occupancy state.
Figure 3B:
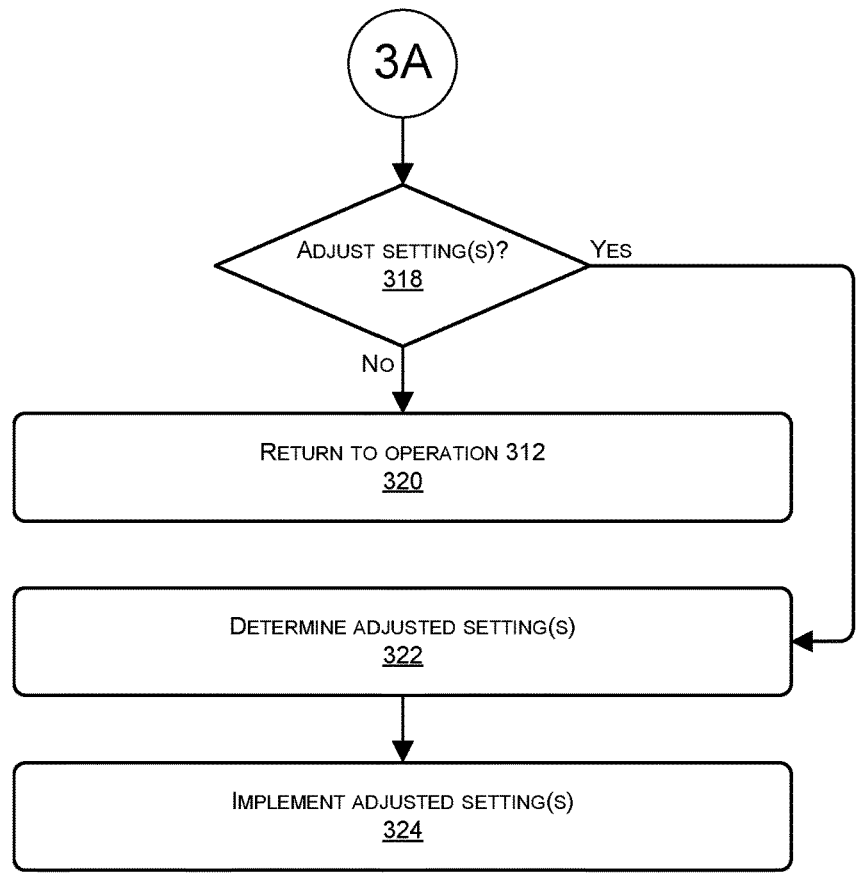

FIGS. 3A-B collectively illustrate a flow diagram of an example process 300 for storing settings in association with different occupancy states, as well as adjusting these settings upon detecting a new occupancy state. The process 300 may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the process may be performed, in whole or in part, by components residing on the vehicle 200, the servers 252, and/or a combination thereof.

An operation 302 represents generating sensor data using one or more sensors of a vehicle, such as the vehicle 200. This operation may comprise a seatbelt sensor 208 generating sensor data indicating whether a respective seat belt is latched, a weight sensor 206 residing in a respective seat, a camera 204 configured to generate image data of a user in a respective seat, or door-closure sensor configured to indicate whether a respective door has been opened and closed, and/or the like. An operation 304 represents storing analyzing the sensor data to determine whether the sensor data corresponds to and, thus, represents an occupancy state of the vehicle.

An operation 306 represents determining whether an occupancy state has been determined from analyzing the sensor data. If not, then the process returns to generating the sensor data at the operation 302. If so, however, then an operation 308 comprises determining and storing one or more vehicle settings, such as a current audio volume, a current setting of the entertainment system, and/or a current setting of the climate-control system. An operation 310 represents storing the occupancy state in association with the determined vehicle settings.

An operation 312 represents generating additional sensor data using the one or more sensors of a vehicle, such as the vehicle 200. Again, this operation may comprise a seatbelt sensor 208 generating sensor data indicating whether a respective seat belt is latched, a weight sensor 206 residing in a respective seat, a camera 204 configured to generate image data of a user in a respective seat, or door-closure sensor configured to indicate whether a respective door has been opened and closed, and/or the like. An operation 314 represents storing analyzing the sensor data to determine whether the sensor data corresponds to and, thus, represents an occupancy state of the vehicle.

An operation 316 represents determining whether an occupancy state has been determined from analyzing the sensor data. If not, then the process returns to generating the additional sensor data at the operation 312. If so, however, then the process 300 continues to FIG. 3B.

FIG. 3B continues the illustration and includes, at an operation 318, determining whether to adjust one or more settings based on the change in occupancy states. Adjusting these settings may comprise adjusting a volume or other setting of an audio system, adjusting content being played back on the audio system, adjusting a setting of an entertainment system or content being played back by the entertainment system, a setting associated with the climate-control system (or whether to turn off or on the climate-control system), and/or the like.

For instance, if the settings-adjustment component 230 determines not to adjust any settings, then at an operation 320 the process 300 returns to generating additional sensor data at the operation 312. If, however, the settings-adjustment component determines to adjust settings of one or more of the vehicle systems, then at an operation 324 the settings-adjustment component 230 may implement the adjusted settings. For instance, the settings-adjustment component 230 may send respective instructions to the audio system, the entertainment system, and/or the climate-control system to implement the adjusted settings.

Figure 4A:
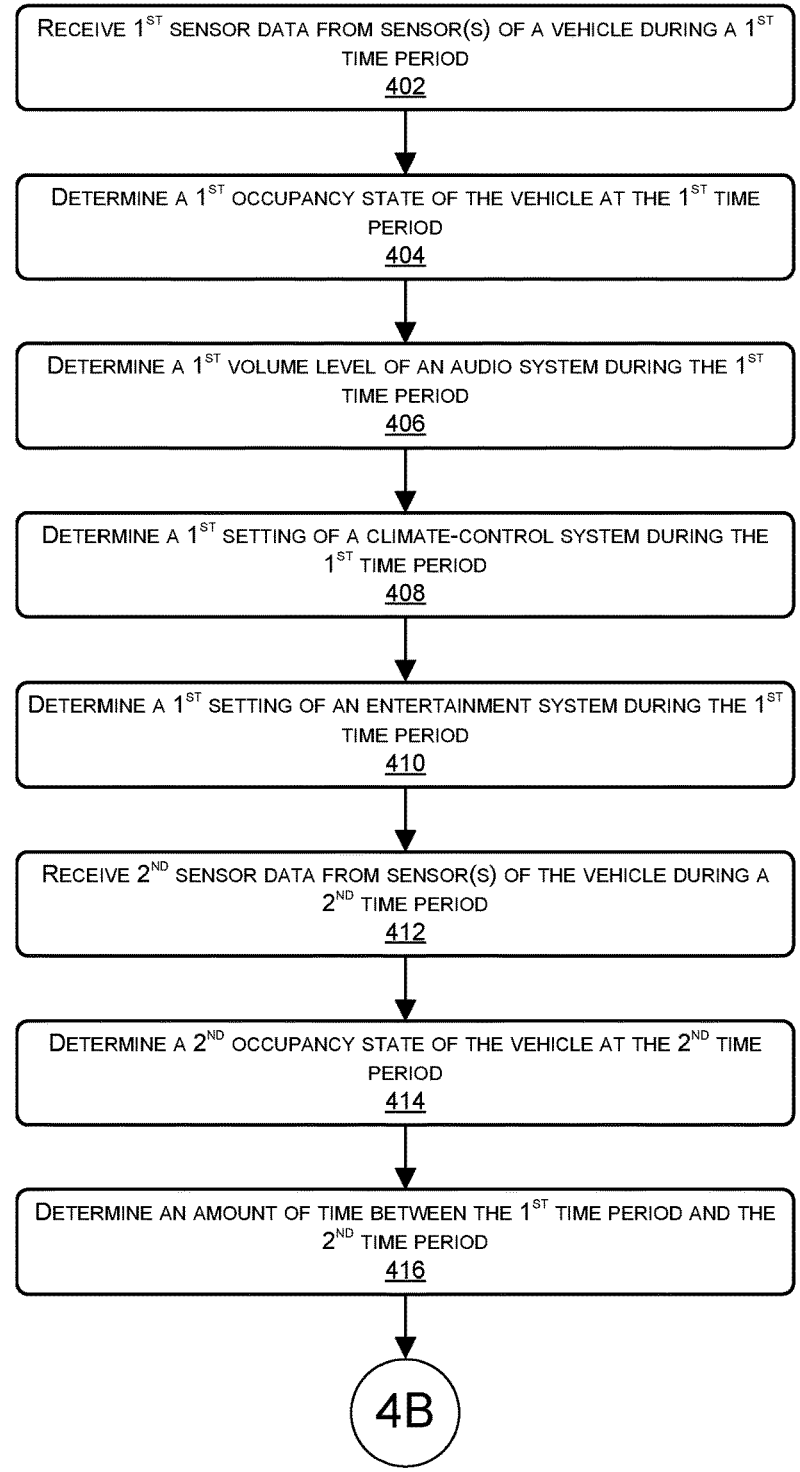
FIGS. 4A-B collectively illustrate a flow diagram of another example process for storing audio-system settings in association with a first occupancy state, as well as adjusting these audio-system settings upon detecting a second occupancy state.
Figure 4B:
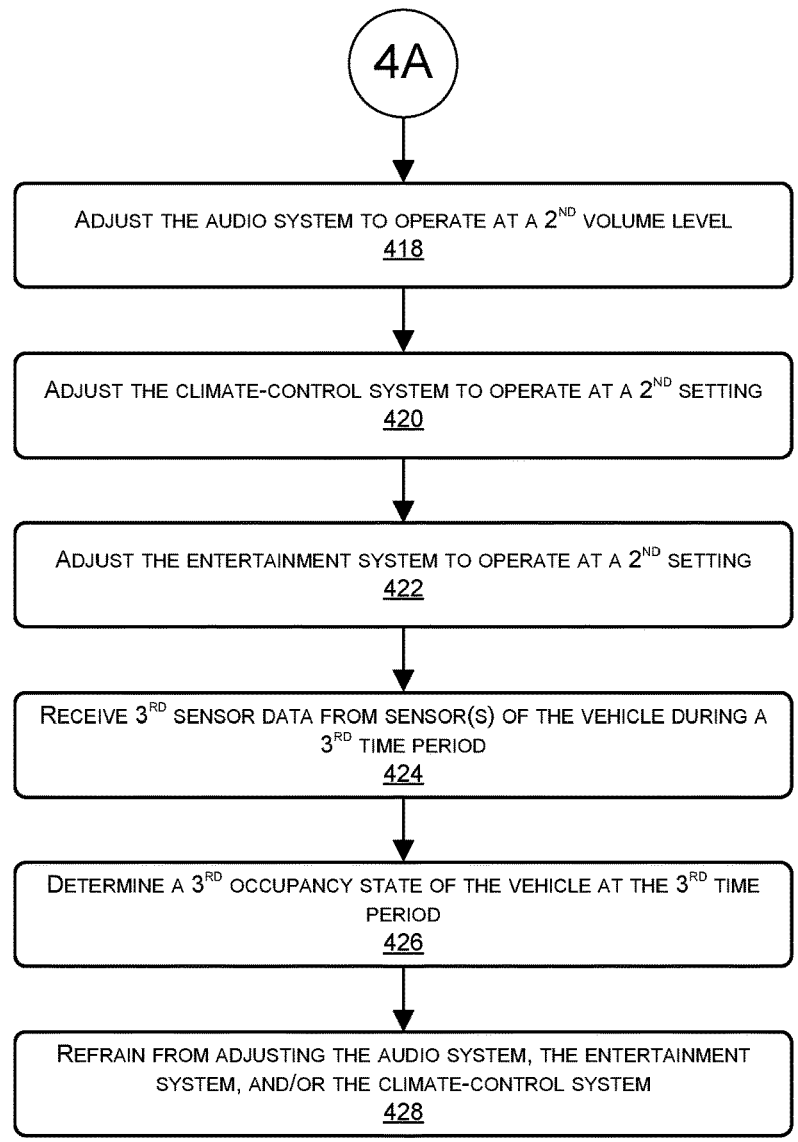

FIGS. 4A-B collectively illustrate a flow diagram of another example process 400 for storing audio-system settings in association with a first occupancy state, as well as adjusting these audio-system settings upon detecting a second occupancy state. The process 400 may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the process may be performed, in whole or in part, by components residing on the vehicle 200, the servers 252, and/or a combination thereof.

To begin, an operation 402 comprises receiving first sensor data from one or more sensors during the first time period, the first sensor data indicating whether each of multiple seats in the vehicle is occupied during the first time period. For instance, this operation may include the occupancy state component 228 receiving the first sensor data from any one or more sensors of the vehicle 200, such as the microphones 202, the cameras 204, the weight sensors 206, the seatbelt sensors 208, and/or any other sensors 210 of the vehicle 200 such as door-latch sensors or the like.

An operation 404 comprises determining a first occupancy state of a vehicle at a first time period, which may be based on the first sensor data. For instance, the occupancy-state component 228 may analyze the first sensor data to determine the first occupancy state, such as the number of passengers in the vehicle 200, which seats are occupied, the identity of the users within the vehicle 200, and so forth. For instance, the occupancy-state component 228 may determine, from the weight data and the seatbelt-sensor data how many and which seats of the vehicle 200 are currently occupied and may store this information as the first occupancy state.

An operation 406 represents determining a first volume level of an audio system of the vehicle during the first time period, the first volume level being manually set by a user associated with the first occupancy state. For instance, the settings-adjustment component 230 may analyze, during the first time period associated with the first occupancy state, the audio-system settings 242 to determine the first volume level. Next, an operation 408 may comprise determining a first setting associated with a climate-control system of the vehicle at the first time period, the first setting being manually set by the user associated with the first occupancy state. Again, the settings-adjustment component 228 may analyze, during the first time period associated with the first occupancy state, the climate-control settings 246 to determine the first setting. In addition, an operation 410 represents determining a first setting associated with an entertainment system of the vehicle at the first time period, the first setting being manually set by the user associated with the first occupancy state. This first setting may comprise whether a rear-facing display is on, the content being shown, and/or the like. As above, the settings-adjustment component 228 may analyze, during the first time period associated with the first occupancy state, the entertainment-system settings 244 to determine the first setting.

An operation 412 may comprise receiving second sensor data from the one or more sensors during the second time period, the second sensor data indicating whether each of the multiple seats in the vehicle is occupied during the second time period. For instance, this operation may include the occupancy state component 228 receiving the second sensor data from any one or more sensors of the vehicle 200, such as the microphones 202, the cameras 204, the weight sensors 206, the seatbelt sensors 208, and/or any other sensors 210 of the vehicle 200 such as door-latch sensors or the like. The second time period may correspond to a time period that is different from and after the first time period.

An operation 414 represents determining a second occupancy state of a vehicle at the second time period, which may be based on the second sensor data. For instance, the occupancy-state component 228 may analyze the second sensor data to determine the second occupancy state, such as the number of passengers in the vehicle 200, which seats are occupied, the identity of the users within the vehicle 200, and so forth. For instance, the occupancy-state component 228 may determine, from the weight data and the seatbelt-sensor data how many and which seats of the vehicle 200 are currently occupied and may store this information as the second occupancy state. An operation 416, meanwhile, may comprise determining an amount of time between the first time period and the second time period, which may be used in determining whether and/or how to adjust settings associated with the vehicle in response to the change from the first occupancy state to the second occupancy state.

FIG. 4B continues the illustration of the process 400 and includes, at an operation 418, adjusting the audio system of the vehicle to operate at a second volume level that is less than the first volume level at least partly in response to determining the second occupancy state at the second time period. For instance, the settings-adjustment component 230 may adjust the volume of the audio system to a lower volume level in response to determining that the first occupancy state comprised a single driver with no passengers, and the second occupancy state comprises multiple people within the vehicle 200, some of which may not desire loud music or other audio.

An operation 420, meanwhile, represents adjusting the climate-control system of the vehicle to operate at a second setting at least partly in response to determining the second occupancy state at the second time period. For instance, the settings-adjustment component 230 may turn on a rear-climate system in response to determining that one or more passengers reside in the rear of the vehicle 200 in the second occupancy state, may change the temperature to a value previously set by a user for the second occupancy state, or the like.

Next, an operation 422 represents adjusting a setting associated with an entertainment system of the vehicle at least partly in response to determining the second occupancy state at the second time period. For instance, the settings-adjustment component 230 may turn on (or off) the entertainment system or a display of the entertainment system based at least in part on detecting the change from the first occupancy state to the second occupancy state. For instance, if the first occupancy state does not include any passengers in the rear seats of the vehicle 200, whereas the second occupancy state does include one or more passengers in the rear seat(s), this operation may comprise turning on the entertainment system or a display of the entertainment display. Conversely, if the first occupancy state includes one or more passengers in the rear seats of the vehicle 200, whereas the second occupancy state does not, this operation may comprise turning off the entertainment system or a display of the entertainment display.

An operation 424 represents receiving third sensor data from the one or more sensors during a third time period, the third sensor data indicating whether each of the multiple seats in the vehicle is occupied during the second time period. For instance, this operation may include the occupancy state component 228 receiving the third sensor data from any one or more sensors of the vehicle 200, such as the microphones 202, the cameras 204, the weight sensors 206, the seatbelt sensors 208, and/or any other sensors 210 of the vehicle 200 such as door-latch sensors or the like. The third time period may correspond to a time period that is different from and after the second time period.

An operation 426 represents determining a third occupancy state of a vehicle at the third time period, which may be based on the third sensor data and which may differ from the second occupancy state by an amount. For instance, the occupancy-state component 228 may analyze the third sensor data to determine the third occupancy state, such as the number of passengers in the vehicle 200, which seats are occupied, the identity of the users within the vehicle 200, and so forth. For instance, the occupancy-state component 228 may determine, from the weight data and the seatbelt-sensor data how many and which seats of the vehicle 200 are currently occupied and may store this information as the third occupancy state. An operation 428, meanwhile, may comprise refraining from adjusting the audio system of the vehicle based at least in part on the amount. To provide an example, the settings-adjustment component 230 may determine that the change from the second occupancy state to the third occupancy state was not sufficient to change the current setting associated with the audio system. For instance, the probabilistic model 232 described above may determine a slight change between the occupancy states (e.g., from four users to five users) and that the volume level was within a relatively normal range and, thus, that no change is to be implemented. Of course, while an example is provided, it is to be appreciated that the settings-adjustment component 230 may determine to refrain from adjusting settings based on other factors and in other examples.

Figure 5:
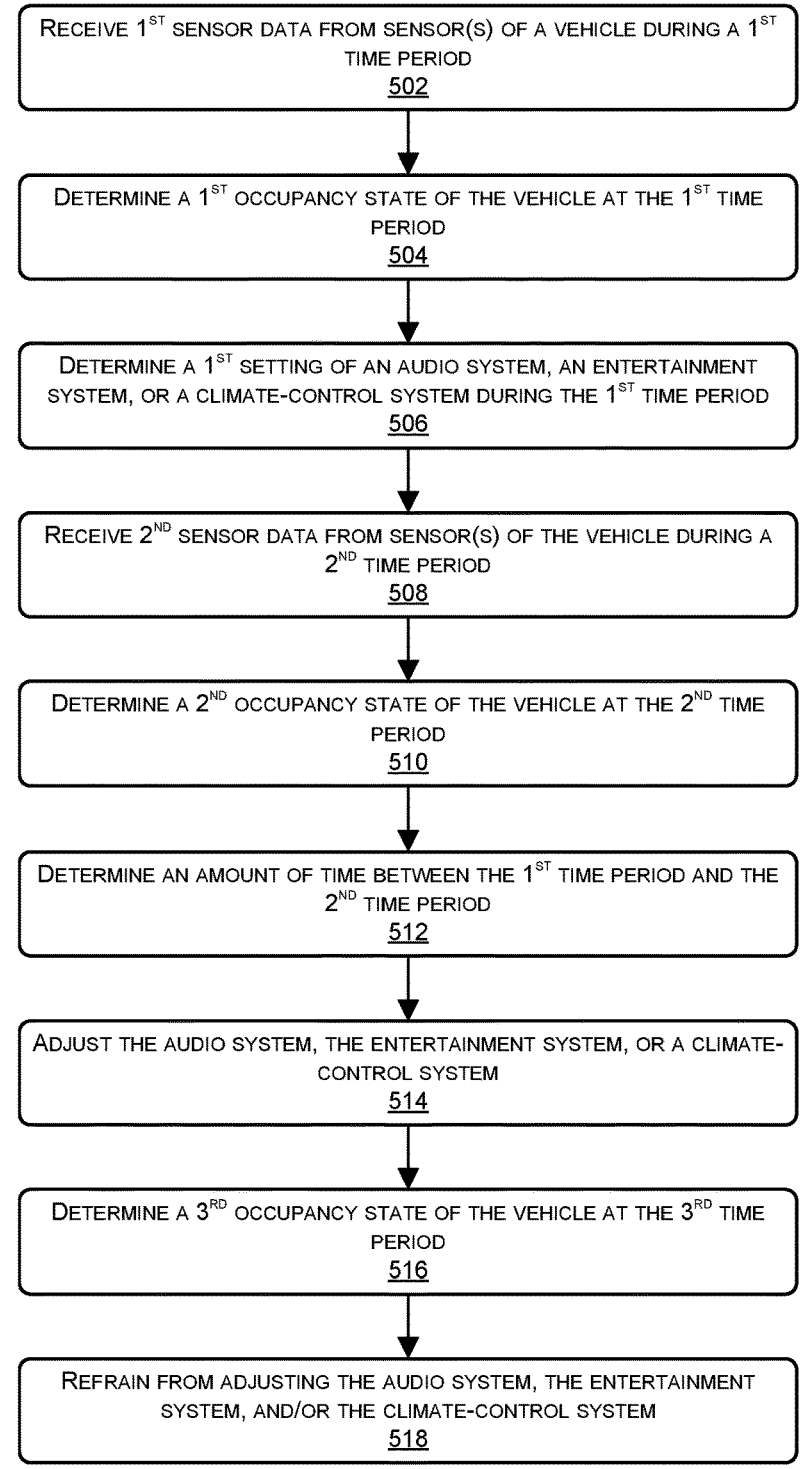
FIG. 5 collectively illustrates a flow diagram of another example process for storing one or more vehicle-based settings in association with a first occupancy state, as well as adjusting these vehicle-based settings upon detecting a second occupancy state.

FIG. 5 collectively illustrates a flow diagram of another example process 500 for storing one or more vehicle-based settings in association with a first occupancy state, as well as adjusting these vehicle-based settings upon detecting a second occupancy state. The process 500 may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the process may be performed, in whole or in part, by components residing on the vehicle 200, the servers 252, and/or a combination thereof.

An operation 502 may comprise receiving first sensor data from one or more sensors during the first time period, the first sensor data indicating whether each of multiple seats in the vehicle is occupied during the first time period. For instance, this operation may include the occupancy state component 228 receiving the first sensor data from any one or more sensors of the vehicle 200, such as the microphones 202, the cameras 204, the weight sensors 206, the seatbelt sensors 208, and/or any other sensors 210 of the vehicle 200 such as door-latch sensors or the like.

An operation 504 comprises determining a first occupancy state of a vehicle at a first time period, which may be based on the first sensor data. For instance, the occupancy-state component 228 may analyze the first sensor data to determine the first occupancy state, such as the number of passengers in the vehicle 200, which seats are occupied, the identity of the users within the vehicle 200, and so forth. For instance, the occupancy-state component 228 may determine, from the weight data and the seatbelt-sensor data how many and which seats of the vehicle 200 are currently occupied and may store this information as the first occupancy state.

An operation 506 represents determining a first setting of at least one of an audio system of the vehicle during the first time period, a first setting associated with a climate-control system of the vehicle at the first time period, and/or a first setting associated with an entertainment system of the vehicle at the first time period. For instance, the settings-adjustment component 230 may analyze, during the first time period associated with the first occupancy state, the audio-system settings 242 to determine a first volume level, the climate-control settings 246 to determine the first setting associated with the climate-control system, or the entertainment-system settings 244 to determine the first setting associated with the entertainment-system.

An operation 508 may comprise receiving second sensor data from the one or more sensors during the second time period, the second sensor data indicating whether each of the multiple seats in the vehicle is occupied during the second time period. For instance, this operation may include the occupancy state component 228 receiving the second sensor data from any one or more sensors of the vehicle 200, such as the microphones 202, the cameras 204, the weight sensors 206, the seatbelt sensors 208, and/or any other sensors 210 of the vehicle 200 such as door-latch sensors or the like. The second time period may correspond to a time period that is different from and after the first time period.

An operation 510 represents determining a second occupancy state of a vehicle at the second time period, which may be based on the second sensor data. For instance, the occupancy-state component 228 may analyze the second sensor data to determine the second occupancy state, such as the number of passengers in the vehicle 200, which seats are occupied, the identity of the users within the vehicle 200, and so forth. For instance, the occupancy-state component 228 may determine, from the weight data and the seatbelt-sensor data how many and which seats of the vehicle 200 are currently occupied and may store this information as the second occupancy state. An operation 416, meanwhile, may comprise determining an amount of time between the first time period and the second time period, which may be used in determining whether and/or how to adjust settings associated with the vehicle in response to the change from the first occupancy state to the second occupancy state.

Next, at an operation 512 represents determining an amount of time between the first time period and the second time period, which the settings-adjustment component 230 may use to determine whether and/or how to adjust settings associated with the system(s) of the vehicle. An operation 514 represents a setting associated with at least one of the audio system, the climate-control system, or the entertainment system at least partly in response to determining the second occupancy state at the second time period. For instance, the settings-adjustment component 230 may up or down a volume of the audio system, may turn on (or off) the entertainment system or a display of the entertainment system, and/or may turn on, off, up, or down a setting associated with the climate-control system.

An operation 516 represents determining a third occupancy state of a vehicle at a third time period, which may be based on third sensor data and which may differ from the second occupancy state by an amount. An operation 518, meanwhile, may comprise refraining from adjusting the audio system of the vehicle based at least in part on the amount. To provide an example, the settings-adjustment component 230 may determine that the change from the second occupancy state to the third occupancy state was not sufficient to change the current setting associated with the audio system. For instance, the probabilistic model 232 described above may determine a slight change between the occupancy states (e.g., from four users to five users) and that the volume level was within a relatively normal range and, thus, that no change is to be implemented. Of course, while an example is provided, it is to be appreciated that the settings-adjustment component 230 may determine to refrain from adjusting settings based on other factors and in other examples.

Figure 6:
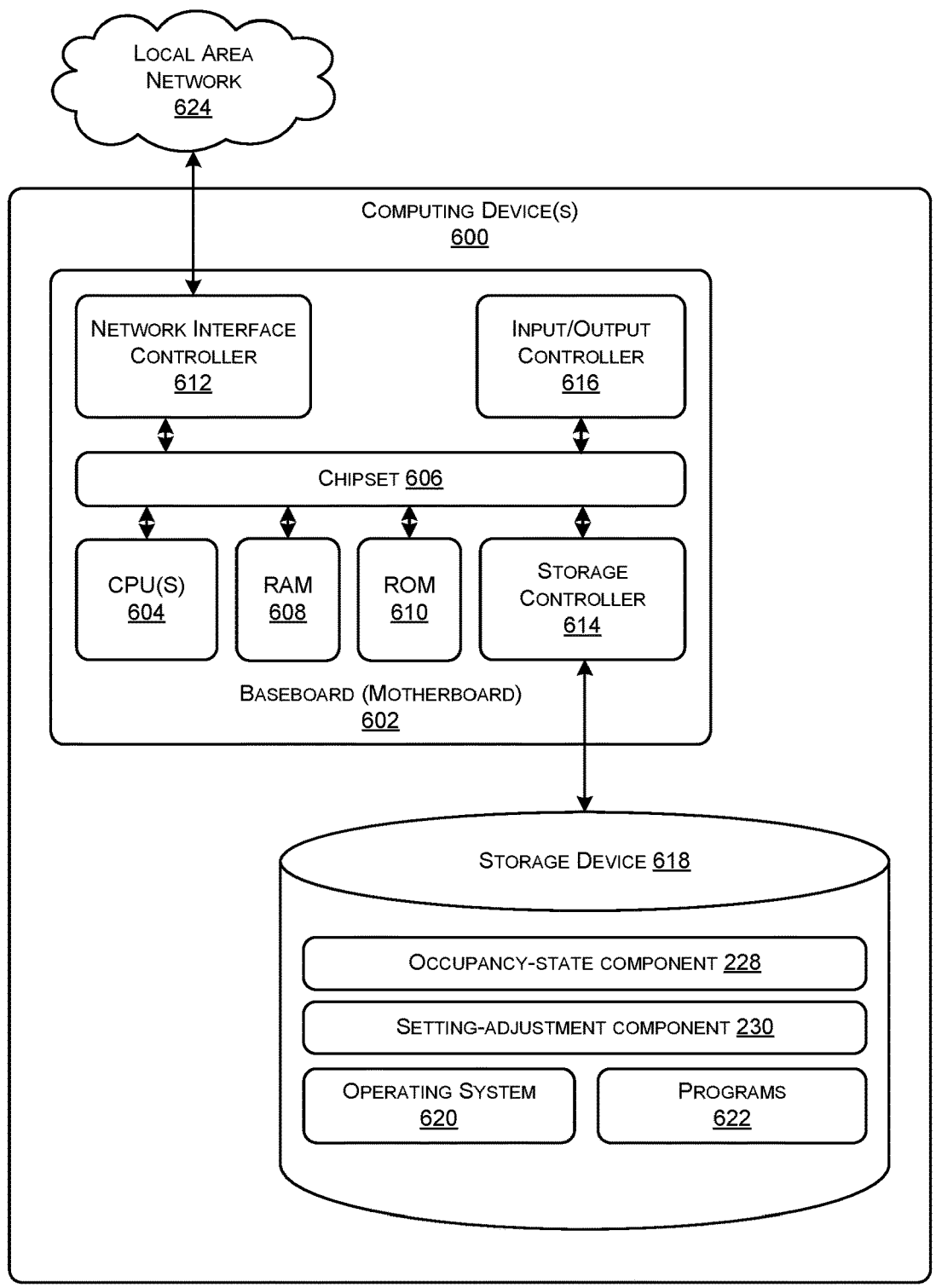
FIG. 6 is a computer architecture diagram showing an illustrative computer hardware architecture for implementing a device that can be utilized to implement aspects of the various technologies presented herein.

FIG. 6 is a computer architecture diagram showing an illustrative computer hardware architecture for implementing a device 600 that can be utilized to implement aspects of the various technologies presented herein. The vehicle 200 and/or the servers 252 described herein may include some or all of the components discussed below with reference to the device 600.

The device 600 includes a baseboard 602, or "motherboard," which is a printed circuit board to which a multitude of components or devices can be connected by way of a system bus or other electrical communication paths. In one illustrative configuration, one or more central processing units (CPUs) 604 operate in conjunction with a chipset 606. The CPUs 604 can be standard programmable processors that perform arithmetic and logical operations necessary for the operation of the device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the device 600. The chipset 606 can further provide an interface to a computer-readable storage medium such as a read-only memory (ROM) 610 or non-volatile RAM (NVRAM) for storing basic routines that help to startup the device 600 and to transfer information between the various components and devices. The ROM 610 or NVRAM can also store other software components necessary for the operation of the device 600 in accordance with the configurations described herein.

The device 600 can operate in a networked environment using logical connections to remote computing devices and computer systems through a network, such as a local area network 624. The chipset 606 can include functionality for providing network connectivity through a Network Interface Card (NIC) 612, such as a gigabit Ethernet adapter. The NIC 612 is capable of connecting the device 600 to other computing devices over the network. It should be appreciated that multiple NICs 612 can be present in the device 600, connecting the computer to other types of networks and remote computer systems.

The device 600 can be connected to a storage device 618 that provides non-volatile storage for the computer. The storage device 618 can store an operating system 620, programs 622, and data, which have been described in greater detail herein. The storage device 618 can be connected to the device 600 through a storage controller 614 connected to the chipset 606. The storage device 618 can consist of one or more physical storage units. The storage controller 614 can interface with the physical storage units through a serial attached SCSI (SAS) interface, a serial advanced technology attachment (SATA) interface, an FC interface, or other type of interface for physically connecting and transferring data between computers and physical storage units.

The device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 600 can further read information from the storage device 618 by detecting the physical states or characteristics of one or more particular locations within the physical storage units.

In addition to the mass storage device 618 described above, the device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 600.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the device 600.

In one embodiment, the storage device 618 or other computer-readable storage media is encoded with computer-executable instructions which, when loaded into the device 600, transform the computer from a general-purpose computing system into a special-purpose computer capable of implementing the embodiments described herein. These computer-executable instructions transform the device 600 by specifying how the CPUs 604 transition between states, as described above. According to one embodiment, the device 600 has access to computer-readable storage media storing computer-executable instructions which, when executed by the device 600, perform the various processes described above with regard to FIGS. 1 and 3-5. The device 600 can also include computer-readable storage media having instructions stored thereupon for performing any of the other computer-implemented operations described herein.

The device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the device 600 might not include all of the components shown in FIG. 6, can include other components that are not explicitly shown in FIG. 6, or might utilize an architecture completely different than that shown in FIG. 6.

The device 600 may also store, in the storage device 618, the occupancy-state component 228, the settings-adjustment component 230, and/or additional elements described above with reference to FIGS. 1-5.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   determining a first occupancy state of a vehicle at a first time period, the first occupancy state indicating that a single user is residing in the vehicle during the first time period;
   determining a first volume level of an audio system of the vehicle during the first time period, the first volume level being manually set by a user associated with the first occupancy state;
   determining a second occupancy state of the vehicle at a second time period that is after the first time period, the second occupancy state indicating that multiple users are residing in the vehicle during the second time period; and
   adjusting the audio system of the vehicle to operate at a second volume level that is less than the first volume level at least partly in response to determining the second occupancy state at the second time period.

2. The method as recited in claim 1, further comprising:
   receiving first sensor data from one or more sensors during the first time period, the first sensor data indicating whether each of multiple seats in the vehicle is occupied during the first time period; and
   receiving second sensor data from the one or more sensors during the second time period, the second sensor data indicating whether each of the multiple seats in the vehicle is occupied during the second time period.

3. The method as recited in claim 2, wherein the one or more sensors comprise a seatbelt sensor configured to indicate whether a respective seat belt is latched, a weight sensor residing in a respective seat, a camera configured to generate image data of a user in a respective seat, or door-closure sensor configured to indicate whether a respective door has been opened and closed.

4. The method as recited in claim 1, further comprising:
   determining a first setting associated with a climate-control system of the vehicle at the first time period, the first setting being manually set by the user associated with the first occupancy state; and
   adjusting the climate-control system of the vehicle to operate at a second setting at least partly in response to determining the second occupancy state at the second time period.

5. The method as recited in claim 1, further comprising adjusting a setting associated with an entertainment system of the vehicle at least partly in response to determining the second occupancy state at the second time period.

6. The method as recited in claim 5, wherein
   the adjusting the setting comprises at least one of turning on the entertainment system or turning on a display associated with the entertainment system.

7. The method as recited in claim 1, further comprising:
   determining a third occupancy state of the vehicle at a third time period that is after the second time period, the third occupancy state indicating that a number of occupants in the vehicle during the third time is different than second a number of occupants in the vehicle during the second time period by an amount; and
   refraining from adjusting the audio system of the vehicle based at least in part on the amount.

8. The method as recited in claim 1, further comprising:
   determining an amount of time between the first time period and the second time period; and
   wherein the adjusting the audio system comprises adjusting the audio system of the vehicle based at least in part on the amount of time between the first time period and the second time period.

9. A system comprising:
   one or more processors; and
   one or more computer-readable media storing computer-executable instructions that, when executed, cause the one or more processors to perform acts comprising:
      determining a first occupancy state of a vehicle at a first time period, the first occupancy state indicating that a single user is residing in the vehicle during the first time period;
      determining a first setting of at least one of an audio system, an entertainment system, or a climate-control system of the vehicle during the first time period;
      determining a second occupancy state of the vehicle at a second time period that is after the first time period, the second occupancy state indicating that multiple users are residing in the vehicle during the second time period; and
      adjusting the at least one of the audio system, the entertainment system, or the climate-control system of the vehicle to operate at a second setting at least partly in response to determining the second occupancy state at the second time period.

10. The system as recited in claim 9, wherein the one or more computer-readable further store computer-executable instructions that, when executed, cause the one or more processors to perform acts comprising:
   receiving first sensor data from one or more sensors during the first time period, the first sensor data indicating whether each of multiple seats in the vehicle is occupied during the first time period; and
   receiving second sensor data from the one or more sensors during the second time period, the second sensor data indicating whether each of the multiple seats in the vehicle is occupied during the second time period.

11. The system as recited in claim 10, wherein the one or more sensors comprise a seatbelt sensor configured to indicate whether a respective seat belt is latched, a weight sensor residing in a respective seat, a camera configured to generate image data of a user in a respective seat, or door-closure sensor configured to indicate whether a respective door has been opened and closed.

12. The system as recited in claim 9, wherein:
the adjusting comprises adjusting the setting of the entertainment system of the vehicle; and
the adjusting the setting comprises at least one of turning on the entertainment system or turning on a display associated with the entertainment system.

13. The system as recited in claim 9, wherein the one or more computer-readable further store computer-executable instructions that, when executed, cause the one or more processors to perform acts comprising:
determining a third occupancy state of the vehicle at a third time period that is after the second time period, the third occupancy state indicating that a number of occupants in the vehicle during the third time is different than second a number of occupants in the vehicle during the second time period by an amount; and
refraining from adjusting the at least one of the audio system, the entertainment system, or the climate-control system of the vehicle based at least in part on the amount.

14. The system as recited in claim 9, wherein the one or more computer-readable further store computer-executable instructions that, when executed, cause the one or more processors to perform acts comprising:
determining an amount of time between the first time period and the second time period; and
wherein the adjusting comprises adjusting the at least one of the audio system, the entertainment system, or the climate-control system of the vehicle based at least in part on the amount of time between the first time period and the second time period.

15. A system comprising:
one or more processors; and
one or more computer-readable media storing computer-executable instructions that, when executed, cause the one or more processors to perform acts comprising:
determining a first occupancy state of a vehicle at a first time period, the first occupancy state indicating that a first number of occupants are in the vehicle;
determining a first setting of at least one of an audio system, an entertainment system, or a climate-control system of the vehicle during the first time period;
determining a second occupancy state of the vehicle at a second time period that is after the first time period, the second occupancy state indicating that a second number of occupants are in the vehicle that is different than the first number of occupants;
determining an amount of time between the first time period and the second time period; and
adjusting, based at least in part on the second occupancy state at the second time period and on the amount of time, the at least one of the audio system, the entertainment system, or the climate-control system of the vehicle to operate at a second setting.

16. The system as recited in claim 15, wherein:
the determining the first occupancy state comprises determining that a single user is residing in the vehicle during the first time period; and
the determining the second occupancy state comprises determining that multiple users are residing in the vehicle during the second time period.

17. The system as recited in claim 15, wherein the one or more computer-readable further store computer-executable instructions that, when executed, cause the one or more processors to perform acts comprising:
receiving first sensor data from one or more sensors during the first time period, the first sensor data indicating whether each of multiple seats in the vehicle is occupied during the first time period; and
receiving second sensor data from the one or more sensors during the second time period, the second sensor data indicating whether each of the multiple seats in the vehicle is occupied during the second time period.

18. The system as recited in claim 17, wherein the one or more sensors comprise a seatbelt sensor configured to indicate whether a respective seat belt is latched, a weight sensor residing in a respective seat, a camera configured to generate image data of a user in a respective seat, or door-closure sensor configured to indicate whether a respective door has been opened and closed.

19. The system as recited in claim 15, wherein:
the adjusting comprises adjusting the setting of the entertainment system of the vehicle;
the determining the first occupancy state comprises determining that a single user is residing in the vehicle during the first time period;
the determining the second occupancy state comprises determining that multiple users are residing in the vehicle during the second time period; and
the adjusting the setting comprises at least one of turning on the entertainment system or turning on a display associated with the entertainment system.

20. The system as recited in claim 15, wherein the one or more computer-readable further store computer-executable instructions that, when executed, cause the one or more processors to perform acts comprising:
determining a third occupancy state of the vehicle at a third time period that is after the second time period, the third occupancy state indicating that a third number of occupants are in the vehicle that is different than the second number of occupants by an amount; and
refraining from adjusting the at least one of the audio system, the entertainment system, or the climate-control system of the vehicle based at least in part on the amount.

* * * * *